(12) United States Patent
Zentile et al.

(10) Patent No.: US 12,474,265 B2
(45) Date of Patent: Nov. 18, 2025

(54) PROBE, A SYSTEM AND A METHOD FOR ANALYSIS OF A LIQUID IN A MIXTURE OF THE LIQUID AND SOLID SUBSTANCE

(71) Applicant: STICHTING IMEC NEDERLAND, Wageningen (NL)

(72) Inventors: Mark Zentile, Arnhem (NL); Xu Zhang, Woudenberg (NL); Peter Offermans, Zaltbommel (NL); David Young, Eindhoven (NL); Arjan Tibbe, Deventer (NL)

(73) Assignee: STICHTING IMEC NEDERLAND, Wageningen (NL)

( * ) Notice: Subject to any disclaimer, the term of this patent is extended or adjusted under 35 U.S.C. 154(b) by 312 days.

(21) Appl. No.: 18/224,135

(22) Filed: Jul. 20, 2023

(65) Prior Publication Data

US 2024/0035964 A1   Feb. 1, 2024

(30) Foreign Application Priority Data

Jul. 28, 2022 (EP) .................................... 22187671

(51) Int. Cl.
   *G01N 21/41* (2006.01)
(52) U.S. Cl.
   CPC ..... *G01N 21/4133* (2013.01); *G01N 2201/08* (2013.01)
(58) Field of Classification Search
   CPC .. G01N 21/4133; G01N 2201/08; G01N 1/12; G01N 33/025; G01N 2021/8521; G01N 2021/8528; G01N 2021/8571; G01N 21/8507
   USPC ...................................................... 356/128
   See application file for complete search history.

(56) References Cited

U.S. PATENT DOCUMENTS

| | | | |
|---|---|---|---|
| 2,972,926 | A | 2/1961 | Goldberg et al. |
| 10,139,340 | B2 | 11/2018 | Harjunmaa et al. |
| 2007/0279624 | A1 | 12/2007 | Lau |
| 2009/0088615 | A1 | 4/2009 | Robinson et al. |
| 2010/0241100 | A1 | 9/2010 | Blumenfeld et al. |

(Continued)

FOREIGN PATENT DOCUMENTS

| | | |
|---|---|---|
| FR | 2737570 A1 | 2/1997 |
| JP | 2004325221 A | 11/2004 |
| WO | WO-2006090596 A1 | 8/2006 |

OTHER PUBLICATIONS

Aronne, et al., Fiber-optic refractometer for in vivo sugar concentration measurements of low-nectar-producing flowers, New Phytologist (2019) 224: 987-993.

(Continued)

*Primary Examiner* — Md M Rahman
(74) *Attorney, Agent, or Firm* — MOSER TABOADA

(57) ABSTRACT

According to an aspect of the present inventive concept there is provided a probe for analysis of a liquid in a mixture of the liquid and solid substance. The probe comprises: a tube comprising a sample end configured to be inserted into the mixture; a cap configured to come into contact with the mixture at the sample end, the cap comprising one or more openings configured for allowing passage of the liquid therethrough, and for preventing passage of the solid substance therethrough; and an optical measurement head arranged in the tube and configured to come into contact with the liquid having passed the one or more openings, wherein the optical measurement head is configured to collect measurement information for analysis of the liquid.

15 Claims, 7 Drawing Sheets

(56) References Cited

U.S. PATENT DOCUMENTS

Figure 1:
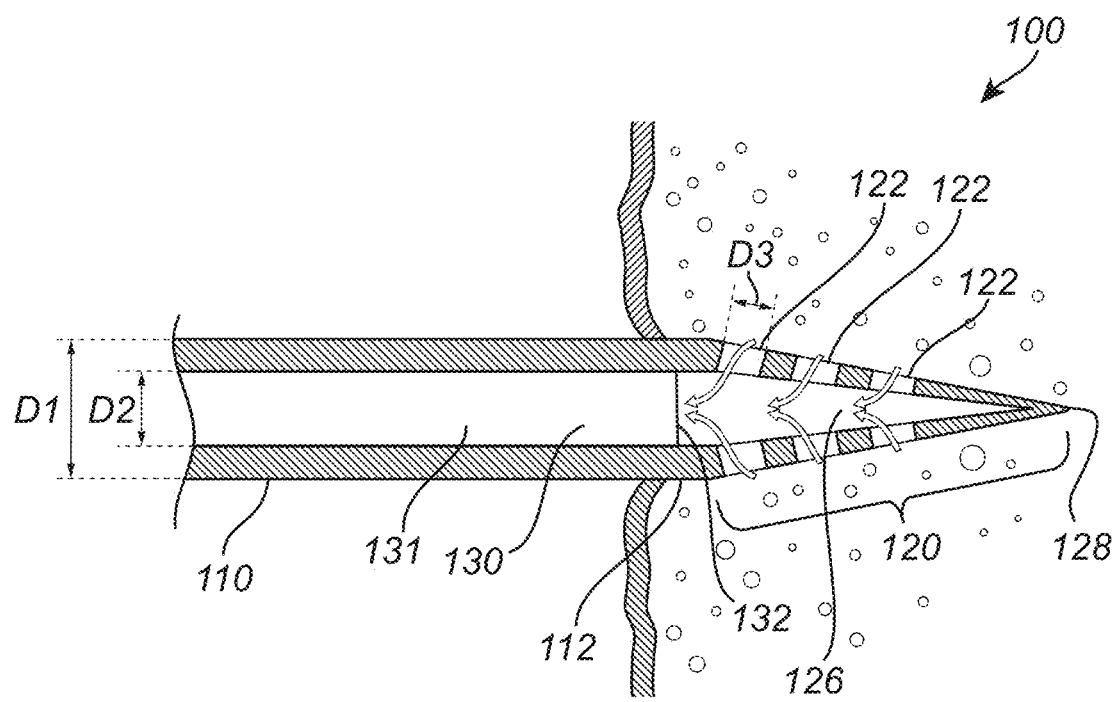

2013/0006069 A1    1/2013   Gil et al.
2014/0088575 A1    3/2014   Loeb
2014/0211206 A1    7/2014   Wang et al.
2017/0086716 A1    3/2017   Frese et al.

OTHER PUBLICATIONS

Chang, et al., A fibre optic Fresnel ratio meter for measurements of solute concentration and refractive index change in fluids, 2002 Meas. Sci. Technol. 13 (2002) 1962-1965.

Banerjee, et al., Fiber optic sensing of liquid refractive index, Sensors and Actuators B 123 (2007) 594-605.

Velderrain-Rodriguez, et al., Technologies in Fresh-Cut Fruit and Vegetables, Springer International Publishing Switzerland 2015.

Gao, et al., A needle-type micro-sampling device for collecting nanoliter sap sample from plants, Analytical and Bioanalytical Chemistry (2021) 413:3081-3091, Springer Nature.

Tomlins, et al., Optical coherence refractometry, Optics Letters / vol. 33, No. 19 / Oct. 1, 2008.

Meyer, et al., Optical fiber refractometer, Review of Scientific Instruments 58, 2047 (1987).

Urrutia, et al., A Comprehensive Review of Optical Fiber Refractometers: Toward a Standard Comparative Criterion, Laser Photonics Rev. 2019, 13, 1900094.

Zhang, et al., Refractive index measurement using single fiber reflectance spectroscopy, J. Biophotonics. 2019.

Omar, et al., Optical Sensor in the Measurement of Fruits Quality: A Review on an Innovative Approach, International Journal of Computer and Electrical Engineering, vol. 1, No. Dec. 5, 2009 1793-8163.

Yu, et al., Micro- and nano-fiber probes for optical sensing, imaging, and stimulation in biomedical applications, vol. 8, No. 11 / Nov. 2020 / Photonics Research.

Extended European Search Report for Application No. EP22187671.7 dated Nov. 29, 2022.

PROBE, A SYSTEM AND A METHOD FOR ANALYSIS OF A LIQUID IN A MIXTURE OF THE LIQUID AND SOLID SUBSTANCE

CROSS-REFERENCE TO RELATED APPLICATIONS

The present application claims the benefit of and priority to EP Patent Application Serial No. 22187671.7, filed Jul. 28, 2022, the entire contents of which is incorporated herein by reference.

TECHNICAL FIELD

The present inventive concept relates to the field of optical measurements, and more specifically to a probe, a system, and a method for analysis of a liquid in a mixture of the liquid and solid substance.

BACKGROUND

Within the field of optical measurement techniques, there are challenges with performing accurate measurements of liquids when the liquids are part of a mixture which also comprises a solid substance making the mixture a turbid medium.

For example, in the agricultural industry, the sugar content measurements in agricultural produce, such as fruits and vegetables, are important for many purposes. Sugar content measurements in agricultural produce can be used to determine the quality and ripeness of the produce and to determine the optimal time to harvest. A commonly used technique for sugar content determination is to measure the refractive index of the liquid juice. However, the produce comprises a mixture of liquid fruit juice and solid fruit flesh constituting a turbid medium. The turbid medium will scatter light which reflects back to the optical measurement device causing interference with the signal to be detected, and resulting in measurement errors. Another potential issue is that the measurement result may be that of the refractive index of flesh and juice combined, rather than the juice alone, affecting the measurement result.

Therefore, typically samples are taken from batches and the juice is extracted from the produce prior to analysis. The juice is analyzed with a refractometer to derive the soluble solid content (SSC) or brix value. However, the sample preparation is time consuming, and it is a destructive method. Destructive measurements only allow a small number of samples resulting in a limited knowledge of batch quality. This also limits sampling done while the fruit is still on the plant and so limits knowledge about the progress of growth.

Non-destructive measurements of sugar content have previously been demonstrated by means of for example reflectance spectroscopy and RGB camera imaging. However, these devices need to be calibrated differently for different species, different cultivars, and sometimes even different harvest years.

Hence, there is a need in the art for further improvements related to optical measurements in turbid media.

SUMMARY

An objective of the present inventive concept is to mitigate, alleviate or eliminate one or more of the above-identified deficiencies in the art and disadvantages singly or in any combination. These and other objectives are at least partly met by the invention as defined in the independent claims. Preferred embodiments are set out in the dependent claims.

According to a first aspect, there is provided a probe for analysis of a liquid in a mixture of the liquid and solid substance, the probe comprising:
  a tube comprising a sample end configured to be inserted into the mixture;
  a cap configured to come into contact with the mixture at the sample end, the cap comprising one or more openings configured for allowing passage of the liquid therethrough, and for preventing passage of the solid substance therethrough; and
  an optical measurement head arranged in the tube and configured to come into contact with the liquid having passed the one or more openings, wherein the optical measurement head is configured to collect measurement information for analysis of the liquid.

The mixture may be in the form of a solid substance within which the liquid is contained. By way of example, the solid substance may be the flesh of a fruit within which liquid fruit juice is contained. Alternatively, the mixture may be in the form of a liquid within which a solid substance is contained. By way of example, the liquid may be gastric fluid within which solid pieces of undigested food is contained.

Objects containing mixtures of liquids and solid substance may be biological matter. By way of example, biological matter may be plants or agricultural produce, such as fruits or vegetables. By way of further example, biological matter may be fluids inside a body of a human or an animal, such as gastric fluid. Objects containing mixtures of liquids and solid substance may alternatively be non-biological matter. By way of example, non-biological matter may be ground water within which sand and other undissolved particles may be present.

By the term "tube" is here meant any unit, device and/or element having a hollow elongated cylindrical shape. By way of example, the tube may be made of, but is not limited to, metal, plastic, rubber, glass or the like. The tube may be in the form of a rigid needle such as a microneedle. The tube may have a sufficiently small outer diameter such that it does not make any permanent damage to the object containing the mixture with the liquid to be analyzed. Alternatively, the tube may be in the form of a flexible tube such as a flexible hose.

The cap is configured as any unit, device and/or element such that, when an outer portion of the cap is in contact with the mixture at the sample end of the tube, the one or more openings allow the liquid to pass from the outer portion to an inner portion of the cap, and simultaneously prevents the solid substance to pass from the outer portion to the inner portion of the cap. The one or more openings may be sufficiently small such that the solid substance cannot pass through the openings. Additionally or alternatively, the cap may be provided with a coating to facilitate liquid passing through the one or more openings, such as a hydrophilic coating. By the present arrangement a portion of the liquid in the mixture may be locally separated from the solid substance of the mixture. The portion of the liquid separated from the mixture allows for collection to be made of measurement information from the liquid alone, without unintentional interference from the solid substance of the mixture.

The cap may be arranged at the sample end of the tube. The cap may be fixedly attached or removably attached to the sample end of the tube. Alternatively, the cap may be arranged inside the tube. By way of example, the cap may be attached to an inner wall of the tube. By way of further example, the cap may alternatively be attached to the optical measurement head inside the tube. In case the optical measurement head is slidably arranged inside the tube, and the cap being attached to the optical measurement head, also the cap may be slidably arranged, along with the optical measurement head, inside the tube. By way of example, the cap may be made of, but is not limited to, metal, plastic, rubber, or glass.

By the term "optical measurement head" is here meant any unit, device and/or element configured to, when being in contact with the liquid, collect measurement information for analysis of the liquid. The optical measurement head may collect measurement information comprising an optical signal, i.e. light. Given as a non-limiting example, the optical signal may be light emitted from the liquid. Alternatively, in case the liquid is being illuminated, the optical signal may be light being scattered by the liquid. Scattered light may be elastically scattered light having the same wavelength as the light illuminating the liquid, or it may be inelastically scattered light, such as induced fluorescence, having a different wavelength than the light illuminating the liquid. In case the liquid is being illuminated, illumination light may be provided either through the optical measurement head itself, or through an external source. If illumination light is provided through the optical measurement head, the optical signal may be a portion of the illumination light being reflected back into the optical measurement head at the interface between the optical measurement head and the liquid.

In this context the term "light" should be allowed a broad interpretation, not limited to visible electromagnetic radiation. Rather, the term "light" may also include for example ultra-violet light and infra-red light.

An advantage with the first aspect is that a portion of the liquid in the mixture may be locally separated from the solid substance such that only the liquid reaches the optical measurement head. Thus, measurement information for analysis of the liquid may be collected without interference from the solid substance. By the present arrangement, interference from the solid substance, as for example light being reflected by the solid substance and unintentionally being coupled into the optical measurement head, that may otherwise cause overestimations or underestimations of the optical signal being measured, may be prevented.

Another advantage is that in vivo analysis of liquids while still inside biological matter may be provided. By way of example, biological matter may be agricultural produce, such as fruits or vegetables. By way of further example, biological matter may be fluids inside a body of a human or an animal, such as gastric fluid. By the present arrangement, the liquid may be analyzed while the liquid is still in the biological matter, thus no extraction of the liquid is required.

Yet another advantage is that analysis of the liquid may be made in vivo without causing any permanent damage to the biological matter. By way of example, analysis of fruits of vegetables may be made inside the produce while still on the plant. In the manner described above, minimally invasive measurements of the liquid content such as sugar content inside fruits may be provided. By "minimally invasive measurement" is here meant a measurement procedure which has no effect on the shelf life of the fruit or cause any deformation, e.g. holes, that are noticeable to a consumer.

According to an embodiment, the optical measurement head comprises an optical waveguide.

By the term "waveguide" is here meant any unit, device and/or element within which light may be guided, and within which transmission is restricted to a single direction, thereby providing transmission with low loss. By way of example, light may be reflected on inner walls of the waveguide by total internal reflection or by means of a reflective coating provided on the walls of the waveguide. Given as non-limiting examples, the waveguide may be a transparent dielectric waveguide, a photonic chip-based waveguide, or an optical fiber.

Thanks to using a waveguide, light may be guided into and out of the mixture to be analyzed. Thus, measurement information may be collected in the mixture, whereas analysis may be performed externally to an object containing the mixture.

According to an embodiment, the optical measurement head comprises an optical fiber comprising a fiber end, the fiber end being arranged to come into contact with the liquid having passed the one or more openings.

An advantage with this embodiment is that the optical fiber may be made very thin and may yet efficiently guide light into and out of the mixture to be analyzed. Thus, by using a probe with an optical fiber, a probe that is less invasive, yet providing efficient light guiding properties, may be provided.

According to an embodiment, the optical measurement head comprises an optical element such as a lens or a prism, or a combination thereof.

According to an embodiment, the optical fiber is further configured to guide light through the fiber to the fiber end, to emit the light through the fiber end into the liquid, and to guide reflected light through the fiber away from the fiber end, wherein the reflected light is light reflected at the interface between the fiber end and the liquid.

Measurement of the intensity of light being reflected at the interface between the fiber end and the liquid, as compared to the intensity of light being guided through the fiber to the fiber end, may provide information about properties of the liquid. For example, the amount of reflected light with respect to incident light may be related to the index of refraction of the liquid.

An advantage with this embodiment is that a robust, reliable and simple manner of measuring the index of refraction of the liquid may be provided. Since the index of refraction may be related to other properties of interest of the liquid, as for example the sugar content of the liquid, a robust, reliable and simple manner of measuring also these properties may be provided.

Another advantage is that illumination and collection of measurement information may be provided using a single optical fiber. By the present arrangement complexity is further reduced as it comprises only few components, and no optical alignment is required between the parts for illumination and collection.

According to an embodiment, an inner portion of the cap has a shape for preventing light emitted through the fiber end from being reflected back from the inner portion of the cap towards the fiber end.

By way of example, the inner portion of the cap may have a tapered shape for preventing light emitted through the fiber end from being reflected back from the inner portion of the cap towards the fiber end. It is conceivable that the inner portion may alternatively have other shapes suitable for preventing light from being reflected back towards the fiber end. For example, the inner portion of the cap may have a convex shape such that light emitted through the fiber end may be reflected radially outwards from the inner portion of the cap.

An advantage with the embodiment is that light emitted through the fiber end may not be reflected in a direction such that the light is returned to the fiber end. By the present arrangement, coupling of reflected light into the fiber may be prevented. Hence, interference inside the optical fiber between the collected optical signal and unintentionally re-coupled reflected light may be minimized or eliminated. Signal-no-noise ratio of the collected measurement information may thereby be improved.

According to an embodiment, an inner portion of the cap comprises a coating of a light absorbing material, for preventing light emitted through the fiber end from being reflected back from the inner portion of the cap towards the fiber end.

It is conceivable that the inner portion of the cap may be provided with a coating of a light absorbing material as an alternative to have a shape for preventing light from being reflected back to the fiber end. However, it is equally conceivable that the inner portion may comprise a combination of a shape for preventing back reflections and a coating of a light absorbing material. By way of example, only parts of the inner portion which are arranged such that light may be reflected back to the fiber end may comprise the coating of the light absorbing material.

In either case, an advantage with the embodiment is that light emitted through the fiber end may not be reflected in a direction such that the light is returned to the fiber end.

According to an embodiment, the optical fiber is arranged in the tube with respect to the cap such that the light emitted through the fiber end does not impinge on the one or more openings of the cap.

By the present arrangement the amount of light being reflected back towards the fiber end may be reduced. Light that would otherwise impinge onto the openings may cause reflections such that some of the reflected light may be reflected back towards the fiber end. Further, light passing through the openings to the outside of the cap may reach the solid substance which may cause the light to be reflected back through the openings and towards the fiber end. If any such reflections reach the fiber end, they may be unintentionally coupled into the fiber. Such reflections may thus be a source of interference with the collected measurement information that may reduce signal-to-noise ratio of the measurement.

An advantage of this embodiment is that the risk of back-reflections being unintentionally coupled into the optical fiber may be further reduced.

According to an embodiment, the cap further comprises:
a first portion arranged proximal to the fiber end, the first portion comprising all the one or more openings; and
a second portion arranged distal to the fiber end,
wherein the fiber end is further configured to emit the light as a light cone, such that the full light cone impinges on inner walls of the second portion.

By the term "proximal" is here meant that the first portion is arranged with respect to the fiber, along a longitudinal direction of the fiber, such that the first portion is close to the fiber end. By the term "distal" is here meant that the second portion is arranged with respect to the fiber, along a longitudinal direction of the fiber, such that the second portion is far from the fiber end. More specifically, the cap is arranged with respect to the fiber, along a longitudinal direction of the fiber, such that the first portion is closer to the fiber end than the second portion.

By the present embodiment, it may be ensured that the light emitted through the fiber end does not impinge on the one or more openings of the cap. The first portion comprising all the one or more openings is arranged close to the fiber end such that the light cone emitted from the fiber end does not reach the first end. The second portion comprising no openings is arranged farther from the fiber end such that the light cone has diverged to a larger cross-section when reaching the second portion such that the full light cone impinges onto the inner wall of the second portion. Thus, no reflections from the one or more holes or the solid substance outside the cap may be generated.

An advantage of this embodiment is that the risk of back-reflections being unintentionally coupled into the optical fiber may be further reduced.

According to an embodiment, the probe further comprises an exhaust hole configured to allow air from inside the cap to pass therethrough, as the air is pushed out of the cap by the liquid passing through the one or more openings into the cap.

When the tube is not inserted into a mixture, the probe is typically located in ambient air, and thus air also fills the inner volume of the cap. Once the tube is inserted into a mixture, the liquid in the mixture may pass through the one or more openings of the cap. However, some of the air may be trapped inside the inner volume of the cap, and the trapped air may form a bubble at the optical measurement head and/or the fiber end. The air bubble may prevent the liquid from reaching the optical measurement head, and may therefore interfere with the collection of measurement information for analysis of the liquid.

The exhaust hole may allow passage of air from inside the cap as the liquid passes through the one or more openings into the cap, pushing the air out of the inner portion of the cap.

An advantage with this embodiment is that the problem of air bubble formation in the inner portion of the cap, preventing the liquid from reaching and coming into contact with the optical measurement head, may be eliminated. This, in turn, may result in more reliable and accurate analysis of the liquid.

According to an embodiment, the exhaust hole is in the form of a slot extending along a side of the tube.

According to an embodiment, the probe is configured for determining an index of refraction of the liquid.

The index of refraction of a liquid may be linked to other properties of the liquid. By way of example, the index of refraction may be linked to the content of sugar, salt, acid or other substances in the liquid. Thus, measurements of index of refraction of juice may be reliably connected to e.g. the sugar content of agricultural produce. Moreover, the link between index of refraction and sugar content may be universal for all juices, independent of species, different cultivars, and harvest year.

An advantage with this embodiment is that measurements of index of refraction may be provided in liquids without the need for any calibration.

Another advantage is that measurements of contents, such as sugar content, of a juice while still inside fruits or vegetables may be provided.

According to an embodiment, the tube has an outer diameter of 1.2 mm or less.

Penetration of the tube should not cause any permanent damage to the object containing the mixture with the liquid to be analyzed. For example, if the object containing the mixture is biological matter such as a fruit or vegetable, it is of importance not to cause any permanent damage to the peel when inserting the tube, since such damage may have an adverse effect on the shelf life of the fruit or vegetable.

An advantage with this embodiment is that by using a tube having an outer diameter of 1.2 mm or less does not show any adverse effect on the shelf life to fruits and vegetables. Thus, by the present arrangement, analysis of liquid inside biological matter, such as fruits or vegetables, without causing any permanent damage with adverse effect on the shelf life or cause any deformation, e.g. holes, that are noticeable to a consumer may be provided.

According to an embodiment, each opening of the one or more openings has a diameter in the interval 0.45 µm to 1 mm, such as in the interval 10 µm to 1 mm.

An advantage with this embodiment is that it is well suited for analysis inside agricultural produce such as fruits and vegetables. The interval of diameter of the openings allows for the liquid juice to pass into the inner portion of the cap, at the same time as the solid substance of fruit flesh is prevented from passing into the inner portion of the cap. By the present arrangement a portion of the liquid juice may be efficiently separated locally from the solid fruit flesh. Thus, the optical measurement head may come into contact with the liquid juice whereas the solid substance is maintained outside the cap at a distance from the optical measurement head.

According to an embodiment, the probe is configured for determining a sugar content in the liquid.

As previously described sugar content in a liquid may be determined by measuring the index of refraction of the liquid. Or more specifically, by measuring the index of refraction of a liquid, the soluble solids content (SSC) of the solution may be measured, sometimes referred to as the Brix value. Out of the soluble solids in agricultural produce such as fruits and vegetables, sugars are the most abundant one. By measuring the sugar content, maturity, flavor, and level of sweetness in fruits and vegetables may be determined. This, in turn may help in fixing the time of harvest, sales, and processing.

An advantage with this embodiment is that the sugar content in fruits and vegetables may be reliably analyzed on a farm, a storage facility, and even while the fruits and vegetables are still on the plants.

According to an embodiment, the cap has a pointed shape, thereby facilitating penetrating the solid substance.

An advantage with this embodiment is that penetration through a solid substance, such as the peel or flesh of fruits or vegetables may be facilitated.

Another advantage is that by facilitating penetration through a solid substance, less damage may be made to the solid substance when the probe penetrates the solid substance, which may result in minimized adverse effect to the solid substance.

According to a second aspect, there is provided a system for analysis of a liquid in a mixture of the liquid and solid substance, the system comprising:
 a probe according to the first aspect;
 a light source configured to emit light;
 a detector comprising a light sensitive element configured to generate an electric signal dependent on an intensity of light incident onto the light sensitive element.

By the term "light source" is here meant any unit, device and/or element at which light is generated. By way of example, the light source may be, but is not limited to a laser, a laser diode, a light emitting diode, an incandescent light source, a fluorescent light source, or a combination thereof.

By the term "detector" is here meant any unit or device onto which a light sensitive element is arranged such that it may detect the light intensity incident onto the light sensitive element, and in response thereof produce an electrical signal. Given as non-limiting examples, the detector may be a photodiode, a photo-multiplier tube (PMT), or an image detector such as charge-coupled devices (CCD) or complementary metal oxide semiconductors (CMOS).

According to a third aspect, there is provided a method of performing analysis of a liquid in a mixture of the liquid and solid substance, the method comprising:
 inserting a sample end of a tube into the mixture;
 causing a cap to come into contact with the mixture at the sample end;
 allowing the liquid to pass through one or more openings of the cap,
 preventing passage of the solid substance through the one or more openings of the cap;
 causing an optical measurement head, arranged in the tube, to come into contact with the liquid having passed the one or more openings; and
 collecting, by the optical measurement head, measurement information for analysis of the liquid.

Effects and features of the second and third aspects are largely analogous to those described above in connection with the first aspect. Embodiments mentioned in relation to the first aspect are largely compatible with the second and third aspects. It is further noted that the inventive concepts relate to all possible combinations of features unless explicitly stated otherwise.

Other objectives, features and advantages of the present inventive concept will appear from the following detailed disclosure, from the attached claims as well as from the drawings.

BRIEF DESCRIPTIONS OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 1 schematically illustrates a probe for analysis of a liquid in a mixture of the liquid and solid substance.

Figure 2:
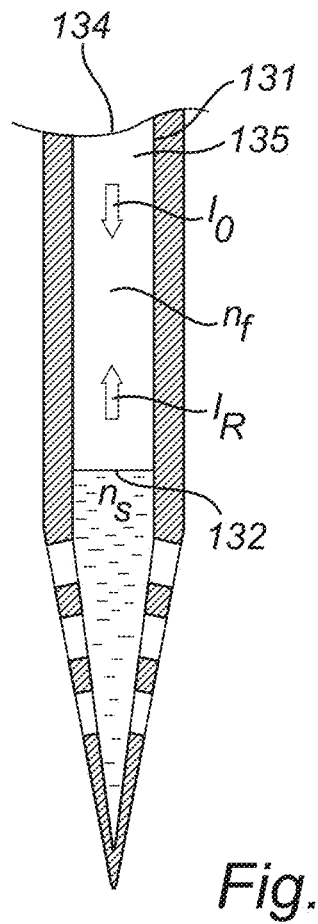

FIG. 2 schematically illustrates the principle of measuring the index of refraction of a liquid.

Figure 3A:
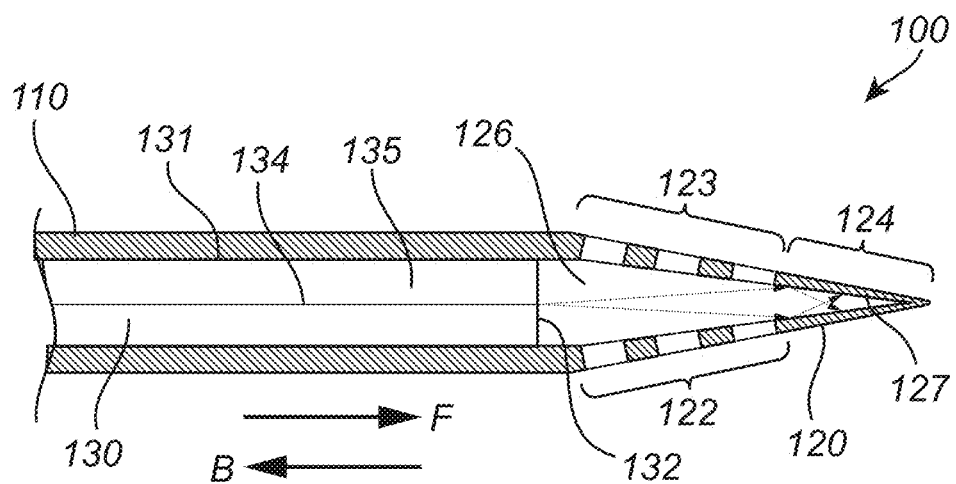

FIG. 3A schematically illustrates the probe with an optical fiber configured to guide light through the fiber core to the fiber end, and to emit the light at the fiber end.

Figure 3B:
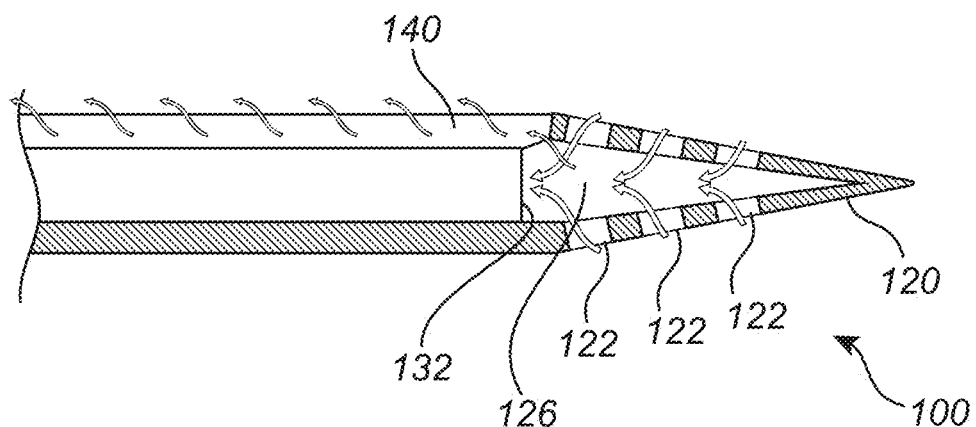

FIG. 3B schematically illustrates the probe provided with an exhaust hole.

Figure 3C:
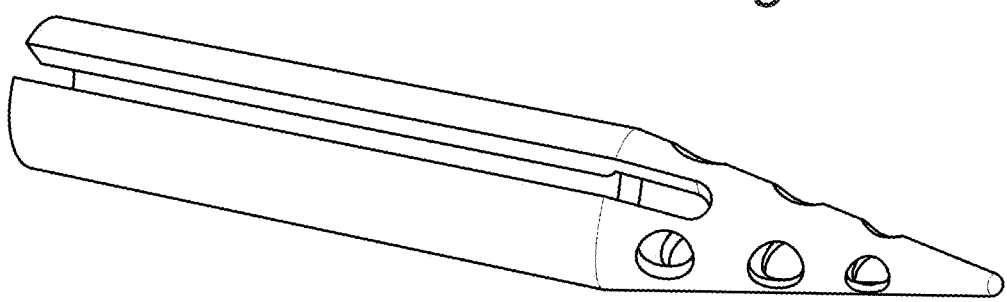

FIG. 3C illustrates a perspective view of the probe for analysis of a liquid in a mixture of the liquid and solid substance.

Figure 4A:
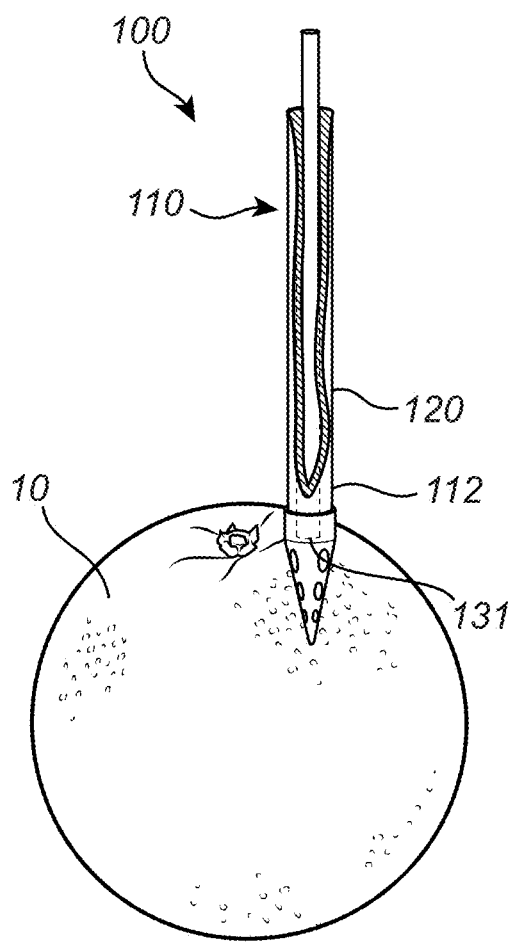

FIG. 4A schematically illustrates the probe applied for analysis of fruit juice inside a fruit.

Figure 4B:
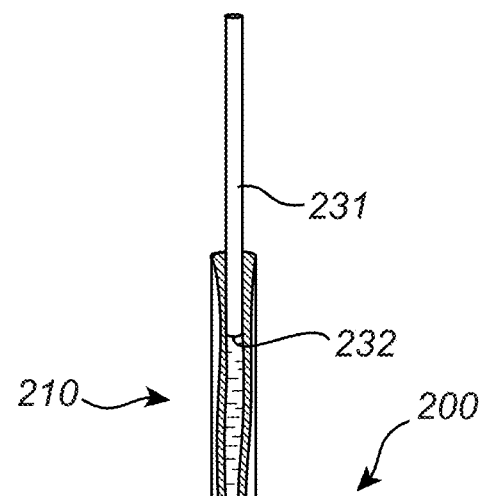
Figure 4B:
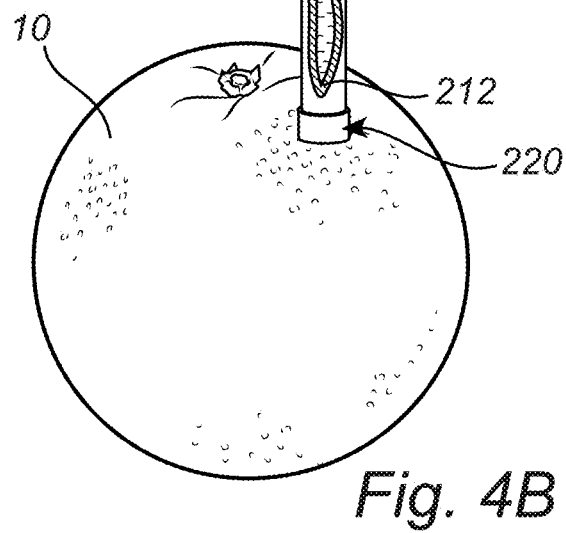

FIG. 4B schematically illustrates a probe applied for analysis of fruit juice inside a fruit, wherein the liquid juice is rising in the tube to meet an optical fiber.

Figure 4C:
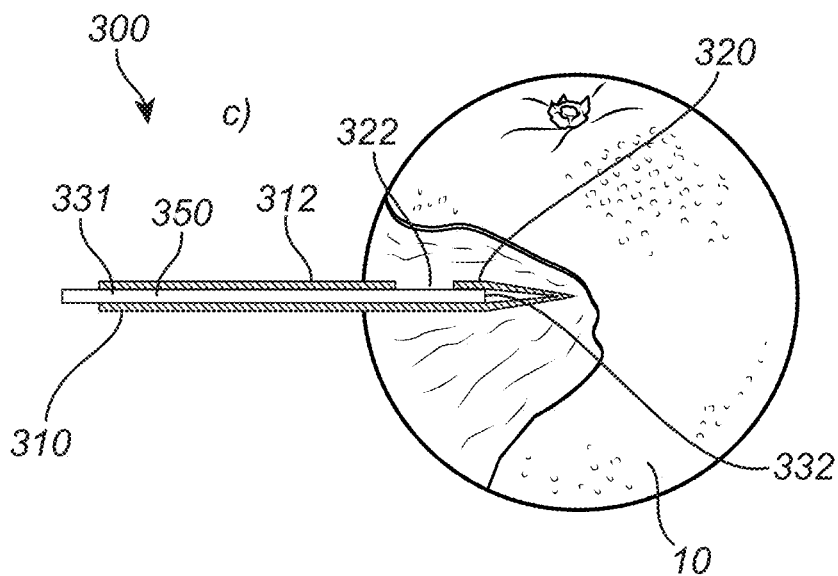

FIG. 4C schematically illustrates a probe applied for analysis of fruit juice inside a fruit, wherein an optical fiber is arranged inside a capillary tube.

Figure 4D:
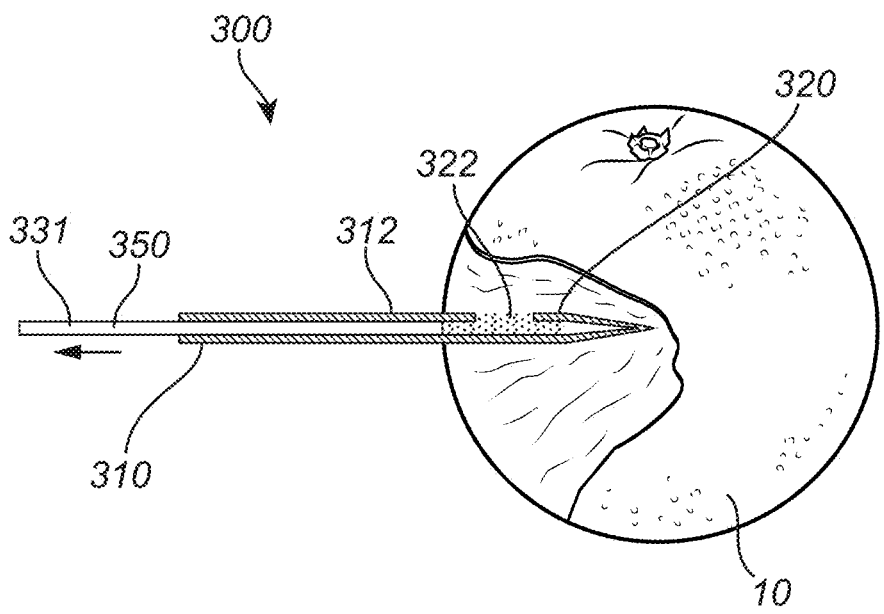

FIG. 4D schematically illustrates that the capillary tube of the probe may be retracted and thereby functioning as a plunger drawing juice from the fruit.

Figure 5:
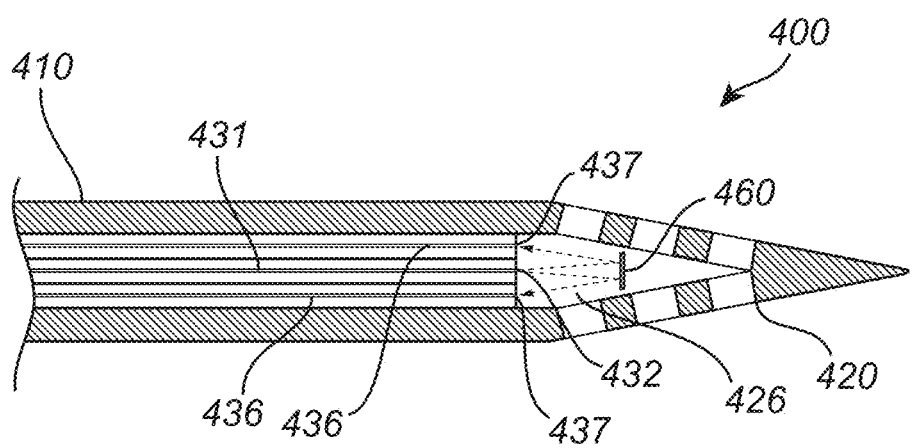

FIG. 5 schematically illustrates a probe for transmission spectrum measurements through a liquid.

Figure 6:
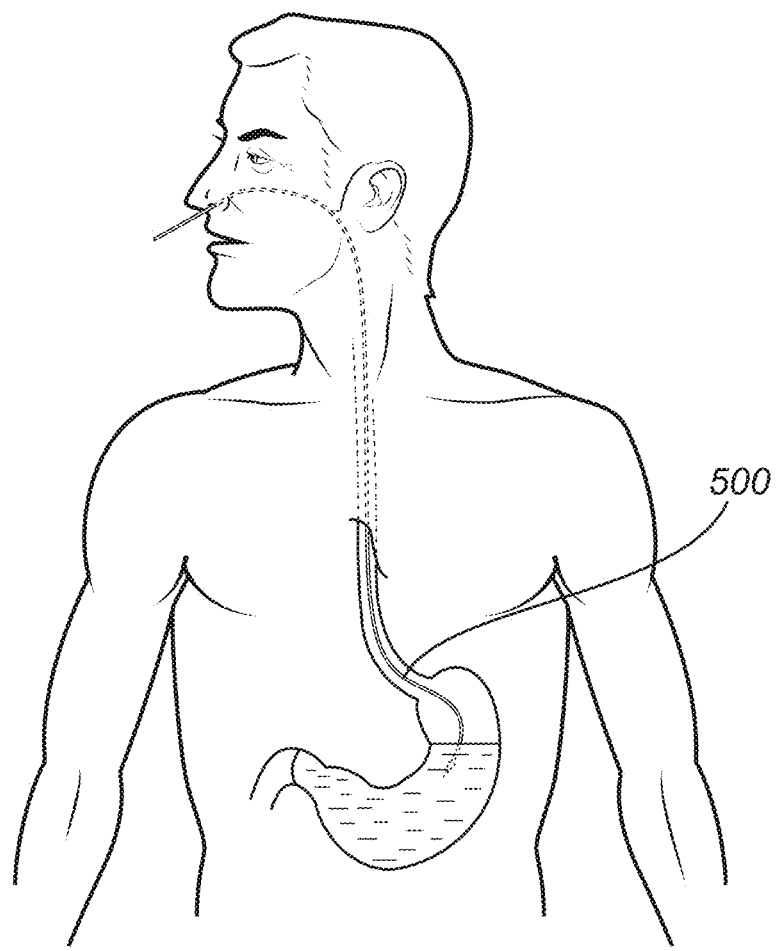

FIG. 6 schematically illustrates a probe for analysis of gastric fluid comprising a liquid and solid substance.

Figure 7A:
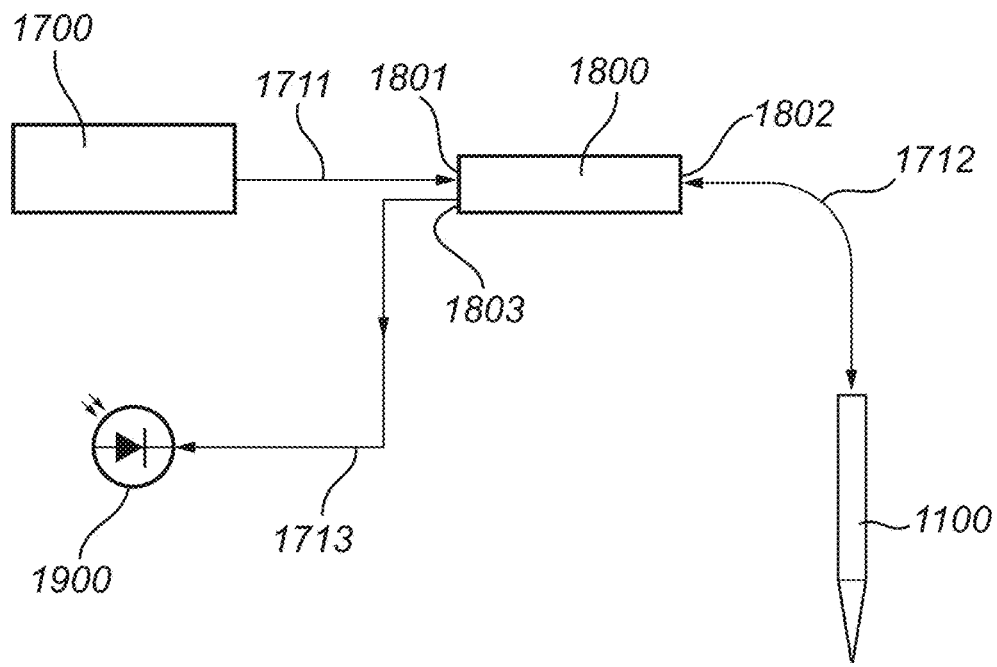

FIG. 7A schematically illustrates a system for analysis of a liquid in a mixture of the liquid and solid substance.

Figure 7B:
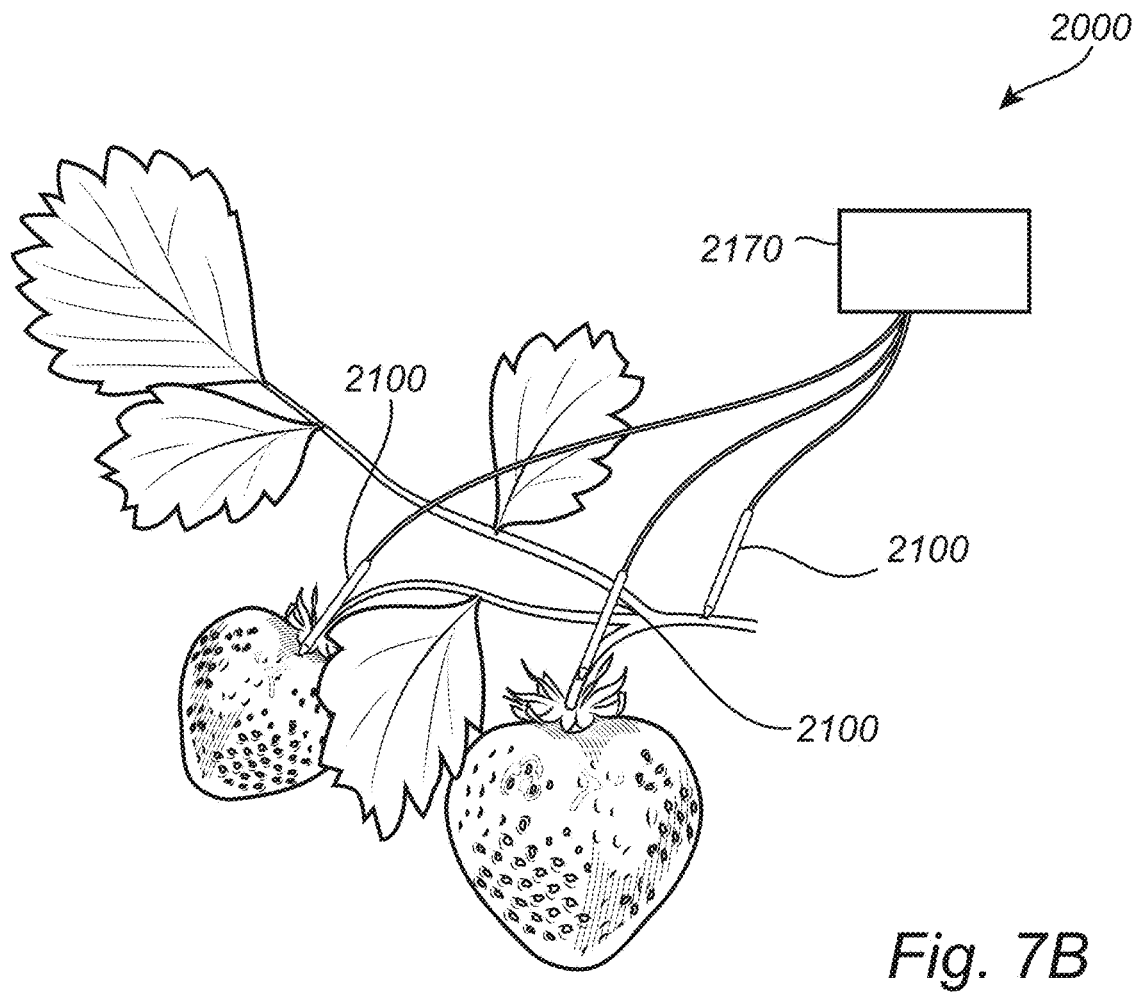

FIG. 7B schematically illustrates a system for in vivo analysis of a liquid inside a plant.

Figure 8:
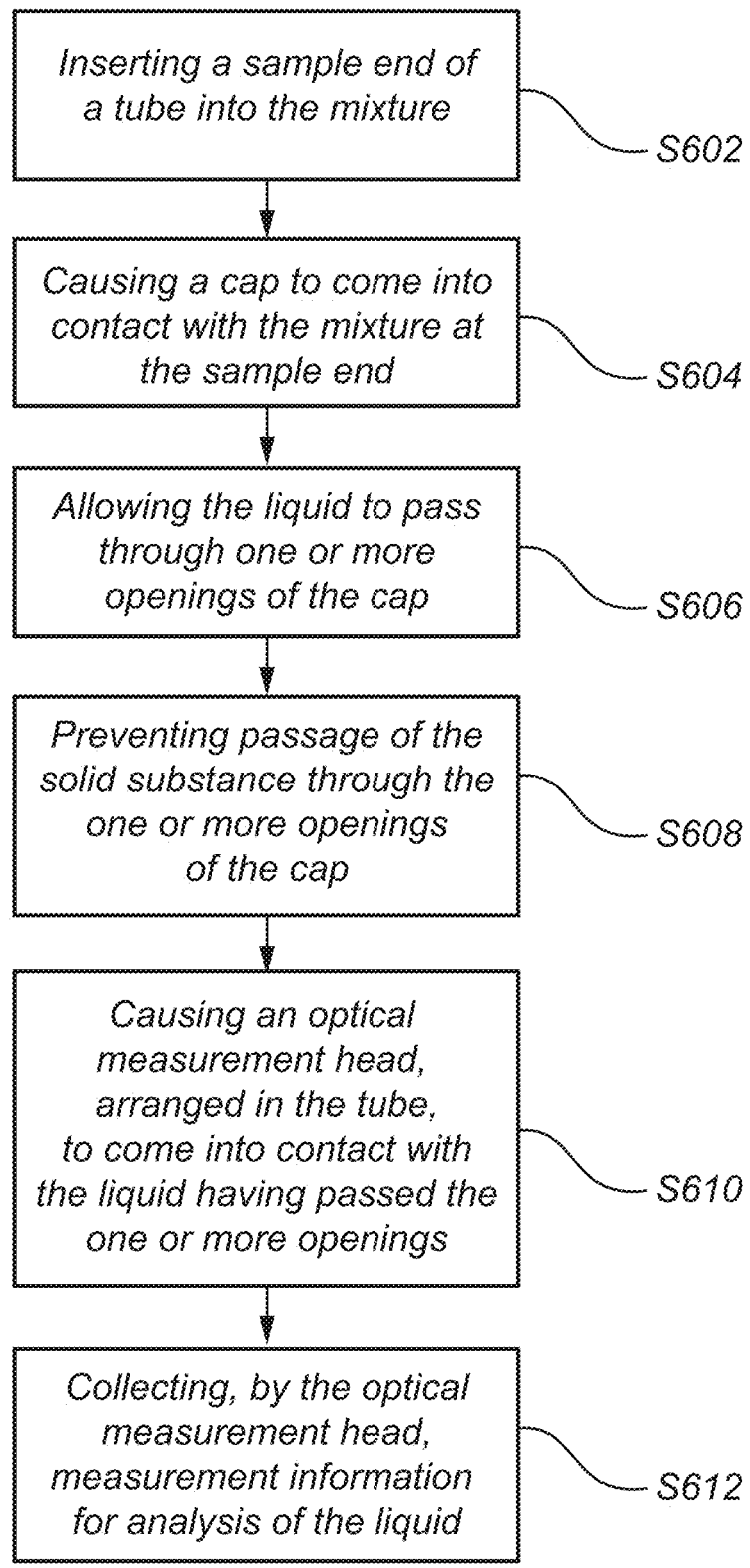

FIG. 8 illustrates a schematic block diagram shortly summarizing the method for performing analysis of a liquid in a mixture of the liquid and solid substance.

DETAILED DESCRIPTION

In cooperation with attached drawings, the technical contents and detailed description of the present inventive concept are described thereinafter according to a preferable embodiment, being not used to limit the claimed scope. This inventive concept may be embodied in many different forms and should not be construed as limited to the embodiments set forth herein; rather, these embodiments are provided for thoroughness and completeness, and fully convey the scope of the inventive concept to the skilled person.

FIG. 1 schematically illustrates a probe 100 for analysis of a liquid in a mixture of the liquid and solid substance. The mixture may be in the form of a solid substance within which the liquid is contained. By way of example, the solid substance may be the flesh of a fruit within which liquid fruit juice is contained. Alternatively, the mixture may be in the form of a liquid within which a solid substance is contained. By way of example, the liquid may be gastric fluid within which solid pieces of undigested food is contained.

The probe 100 comprises a tube 110. The tube 110 is typically shaped as a hollow cylinder extending along the axis of symmetry of the cylinder. The tube 110 has an outer diameter D1 and an inner diameter D2. The tube 110 comprises a sample end 112 configured to be inserted into the mixture.

In embodiments, it is of importance that the insertion of the tube 110 does not cause any permanent damage to the object containing the mixture with the liquid to be analyzed. By way of example, in case the probe 100 is to be used for analysis of liquid inside a fruit or vegetable, it is of importance not to cause any permanent damage to the peel when inserting the tube 110. Damage to the peel may have an adverse effect on the shelf life of the fruit or vegetable. However, it has been found that punctuating fruits of vegetables with a tube 110 having an outer diameter D1 of 1.2 mm or less does not show any adverse effect on the shelf life. Thus, in the case of analysis of liquids in fruits or vegetables, the tube 110 may have an outer diameter D1 of 1.2 mm or less.

The probe 100 further comprises a cap 120. As illustrated in FIG. 1, the cap 120 may be arranged at the sample end 112 of the tube 110, however the cap 120 may alternatively be differently arranged. The cap 120 may be integrated with the tube 110 forming an end of the tube 110 or the cap 120 may be separate from the tube 110 and may be configured to be attached or arranged at the sample end 112 of the tube 110. The cap 120 is configured to come into contact with the mixture at the sample end 112. Thus, as the sample end 112 has been inserted into the mixture, the cap 120 comes into contact with the mixture.

The cap 120 comprises outer wall(s) defining an inner volume 126 of the cap 120. The cap 120 comprises openings 122 in the outer wall(s) that allow the liquid in the mixture to pass therethrough into the inner volume 126 of the cap 120. Further, the openings 122 are configured so as to prevent passage of the solid substance therethrough. By the present arrangement, a portion of the liquid may be separated from the solid substance such that only liquid passes through the openings 122 to reach the inner volume 126 of the cap 120.

The openings have a diameter D3, and depending on the application of the probe 100, the diameter D3 may affect the efficiency with which the cap 120 may separate the liquid from the solid substance. By way of example, each opening 122 may have a diameter D3 in the interval 0.45 µm to 1 mm. Openings 122 with diameters in said interval may be advantageous in case the probe 100 is to be used for analysis of liquid inside fruits or vegetables.

The probe 100 further comprises an optical measurement head 130 arranged in the tube 110. By way of example, the optical measurement head 130 may, but is not limited to, radially fill the full inner diameter D2 of the tube 110.

The optical measurement head 130 is configured to come into contact with the liquid having passed the openings 122 of the cap 120. The optical measurement head 130 may extend from the inside of the tube 110 into the inner volume 126 of the cap 120 such that the optical measurement head 130 may come into contact with the liquid inside the cap 120. As an alternative, the optical measurement head 130 may extend from the inside of the tube 110 to the sample end 112 of the tube 110 such that the optical measurement head 130 may come into contact with the liquid that may flow through the openings 122 of the cap 120 into the sample end 112. As yet another alternative, the liquid may flow through the openings 122 of the cap 120, passing the sample end 112 and further into the tube 110, in which case the optical measurement head 130 may be arranged far inside the tube 110.

The optical measurement head 130 is configured to collect measurement information for analysis of the liquid. Depending on the application, the measurement information may be different types of information. Given as non-limiting examples, the measurement information may comprise information on index of refraction of the liquid, and/or information about the content of sugar, salt, acid or other substances in the liquid.

In the embodiment illustrated in FIG. 1, the optical measurement head 130 comprises an optical fiber 131 arranged inside the tube 110. The optical fiber 131 may collect measurement information from the liquid in the form of an optical signal, i.e. light being collected and transported through the fiber. It serves to mention that collection of optical signals is not limited to optical fibers. Thus, the optical measurement head 130 may alternatively or additionally comprise an optical waveguide and/or an optical element such as a lens or a prism, or a combination thereof.

The optical fiber 131 comprises a fiber end 132 arranged to come into contact with the liquid having passed the openings 122 of the cap 120.

Since only liquid of the mixture may pass through the openings 122 of the cap 120, the solid substance is kept outside the cap 120, such that only liquid may reach the fiber end 132. By the present arrangement, measurement information may be collected by the fiber end 132 without interference from the solid substance in the mixture.

As illustrated in FIG. 1, the present embodiment of the probe 100 comprises a cap 120 having an exterior with a pointed shape. Thus, the exterior of the cap is tapered from the sample end 112 of the tube 110 and in a direction away from the tube 110, such that the cap 120 ends in a tip 128. With a sharp tip 128, penetration of solid substances may be facilitated. This is an advantage when the probe 100 is to be used to analyze a liquid contained inside a solid substance, such as liquid fruit juice still being inside a solid fruit. However, it should be understood that the cap 120 is not limited to comprising a sharp tip 128, but may alternatively comprise a rounded or a truncated tip. A rounded or truncated tip may be advantageous in case no solid substance needs to be penetrated in order for the probe 100 to reach the liquid. By way of example, when analyzing gastric fluid, the probe 100 need not penetrate the solid substance in order to reach the liquid. In case the gastric fluid is in the stomach of a person and the probe guided to the gastric fluid via the throat a rounded or truncated tip may be advantageous since it may lower the risk of unintentionally penetrating any body parts of the person.

FIG. 2 schematically illustrates the principle of measuring the index of refraction of a liquid. The optical fiber 131 comprises a fiber core 134 at the center of the optical fiber 131, surrounded by a fiber cladding 135. The optical fiber 131 is configured to guide light through the fiber core 134 to the fiber end 132. The light may come from a light source (not illustrated here) and comprise light of a specific wavelength.

The light being guided to the fiber end 132, having an intensity $I_0$, may be emitted through the fiber end 132 and into the liquid. However, depending on the difference in the index of refraction $n_f$ of the fiber core 134 and the index of refraction $n_l$ of the liquid, some of the light may not be emitted at the fiber end 132, but may rather be reflected at the interface between the fiber end 132 and the liquid, back into the fiber core 134. The intensity of the reflected light may be denoted $I_R$. The index of refraction of the liquid $n_l$ may be expressed by the following equation:

$$n_l = n_f \left( \frac{1 - \sqrt{R}}{1 + \sqrt{R}} \right)$$

wherein $$R \equiv \frac{I_R}{I_0}$$

Thus, if the index of refraction $n_f$ of the fiber core 134 and the input light intensity $I_0$ are known, the index of refraction $n_l$ of the liquid may be determined by measuring the intensity $I_R$ of the reflected light.

The optical fiber 131 may be configured to guide reflected light through the optical fiber 131 away from the fiber end 132, thus in the opposite direction compared to the input light. By measuring the reflected light intensity by e.g. a photodetector, the index of refraction $n_l$ of the liquid may be determined.

The probe 100 may be configured for determining a sugar content in the liquid such as juice in agricultural produce. Measurements of index of refraction of juice that may be reliably connected to the sugar content are well suited for measuring the sugar content of agricultural produce such as fruits or vegetables. The index of refraction may be related to the sugar content of the produce and is universal for all juices. An advantage is that no calibration is required in order to determine the sugar content of produce.

FIG. 3A schematically illustrates further details of the probe 100. The optical fiber 131 is configured to guide light through the fiber core 134, surrounded by the fiber cladding 135, to the fiber end 132. The light may be emitted through the fiber end 132 and into the liquid.

The optical measurement head 130 with the optical fiber 131 is configured to guide an optical signal, such as reflected light, from the fiber end 132 through the optical fiber 131. Minimizing sources of interference between the optical signal and other light inside the optical fiber 131 enables measurement information to be collected with a large signal-to-noise ratio. The light to be emitted through the fiber end 132 is guided in a forward direction F of the probe, and is typically emitted as a divergent light cone from the fiber core 134. The light cone may propagate through the liquid inside the inner volume 126 of the cap 120, and may eventually impinge onto an inner portion 127 of the cap 120. Light impinging onto the inner portion 127 of the cap 120 may cause back-reflections of light. If such back-reflections propagate in a backward direction B towards the fiber end 132, there is a risk that reflected light may be coupled into the fiber core 134 at the fiber end 132 such that the back-reflection may interfere with the optical signal. Consequently, the collection of measurement information may be compromised as the quality of the measured signal will decrease, which may result in larger uncertainty in the measured quantity.

In order to prevent light emitted through the fiber end 132 from being reflected back from the inner portion 127 of the cap 120 towards the fiber end 132, the inner portion 127 of the cap 120 may have a tapered shape. By providing an inner portion 127 with a tapered shape such that the light of the light cone impinges onto the inner portion 127 with an angle of at least 45 degrees with respect to a normal of the inner portion 127, the reflected light may not propagate in the backward direction B, and may thus not be unintentionally coupled into the optical fiber 131.

Alternatively or additionally, the inner portion 127 of the cap 120 may comprise a coating of a light absorbing material, for preventing light emitted through the fiber end 132 from being reflected back from the inner portion 127 of the cap 120 towards the fiber end 132. By the present arrangement, back-reflections being unintentionally coupled into the optical fiber 131 may be minimized or possibly eliminated.

The optical fiber 131 may be arranged in the tube 110 with respect to the cap 120 such that the light emitted through the fiber end 132 does not impinge on the openings 122 of the cap 120. Such an arrangement may decrease the amount of light being reflected towards the fiber end 132. Firstly, the openings 122 may cause reflections in unexpected directions such that some of the reflected light may be reflected towards the fiber end 132. Secondly, light may pass through some of the openings 122 to the outside of the cap 120. However, outside of the cap 120 a solid substance may be present, that may cause the light to be reflected back through the openings 122 and towards the fiber end 132. Thus, by arranging the optical fiber 131 in the tube 110 with respect to the cap 120 such that the emitted light does not impinge onto the openings 122, the risk of back-reflections being unintentionally coupled into the optical fiber 131 may be further reduced.

By way of example, prevention of back-reflections from the openings 122 and/or from the solid substance outside the openings 122 may be provided for in the following manner. The cap 120 may comprise a first portion 123 arranged proximal to the fiber end 132. The first portion 123 may comprise all the openings 122. The cap 120 may further comprise a second portion 124 arranged distal to the fiber end 132. No openings 122 are thus provided on the second portion 124 of the cap 120.

The fiber 131 is further arranged in the tube 110 such that the distance between the fiber end 132 and the cap 120 is such that the divergence angle of the light cone emitted from the fiber end 132, causes the full light cone to impinge on inner walls of the second portion 124. Put differently, the divergence angle of the light cone, and the distance between the fiber end 132 and the cap 120 are such that all light emitted from the optical fiber 131 impinges onto the second portion 124 of the cap 120 and therefore does not reach to the openings 122 located at the first portion 123 of the cap 120.

FIG. 3B schematically illustrates the probe 100 provided with an exhaust hole 140. Prior to inserting the tube 110 into a mixture to analyze, the probe is typically located in ambient air. Therefore, the inner volume 126 of the cap 120 at the fiber end 132 typically contains air. As the tube 110 is inserted into a mixture, liquid contained in the mixture may pass through the openings 122 of the cap 120 to fill the inner volume 126. However, there may be a risk that some of the air may be trapped inside the inner volume 126, for example if liquid passes through all of the openings 122 such that the air cannot escape. A bubble of air may then be formed at the fiber end 132 preventing the liquid from reaching the fiber end 132. Such an air bubble may compromise the collection of measurement information from the liquid since the optical measurement head 130 cannot come into contact with the liquid.

The problem of air bubbles being trapped inside the inner volume 126 may be prevented by optionally providing the probe 100 with an exhaust hole 140. The exhaust hole 140 may be configured to allow air, or other fluids such as other gases or liquids, from inside the cap 120 to pass through the exhaust hole 140. By the present arrangement, the air may be pushed out of the inner volume 126 of the cap 120 by the liquid passing through the openings 122 into the cap 120. In the manner described above, an optical measurement head 130 coming into contact with the liquid passing through the openings 122 may be ensured.

By way of example, the exhaust hole 140 may be provided in the tube 110 of the probe 100. Further, the exhaust hole 140 may be in the form of a slot extending along a side of the tube 110. However, it is conceivable that the exhaust hole is alternatively provided in other parts of the probe, such as for example in the cap 120. The exhaust hole may alternatively be provided as a circular hole, a rectangular hole, or a hole with any other suitable shape.

FIG. 3C illustrates a perspective view of the probe 100 for analysis of a liquid in a mixture of the liquid and solid substance, comprising some of the features described in relation to FIGS. 3A-3B.

FIG. 4A schematically illustrates a partially cut-away view of the probe 100 applied for analysis of fruit juice inside a fruit 10. The details of probe 100 has been described in relation to FIGS. 1-3 and will not be repeated here.

The cap 120 is fixedly or removably attached to the sample end 112 of the tube 110. It is conceivable that a removably attached cap 120 may be a disposable cap 120, such that a new cap is attached for each new analysis. The cap 120 keeps the fruit flesh from meeting the fiber end 132 of the optical fiber 131 while allowing juice to flow through the openings 122 of the cap 120, and into the inner volume of the cap 120, allowing the fiber end 132 to come into contact with the juice.

FIG. 4B schematically illustrates a partially cut-away view of a probe 200 applied for analysis of fruit juice inside a fruit 10. The probe 200 comprises a tube 210 with a sample end 212 at which a cap 220 is attached. Similarly to the caps previously described, the cap 220 comprises openings allowing passage of liquid therethrough, and preventing passage of solid substances therethrough such that only liquid may enter the inner volume of the cap 220. From the inner volume of the cap 220, liquid may be drawn up into the tube 210 either by capillary force or by a syringe. An optical fiber 231 may be inserted into the tube 210 to meet the liquid rising in the tube 210. By means of the optical fiber 231, the same type of collection of measurement information as previously described may be carried out. It should be understood that the cap 220 does not necessarily need to be a separate part. By way of example, if the tube 210 is a needle at the sample end of which a single opening is provided, the hole being small enough to allow passage of liquid and to prevent passage of solid substances, the sample end 212 with the single opening may be considered to form the cap 210.

FIG. 4C schematically illustrates a probe 300 applied for analysis of fruit juice inside a fruit 10. The probe 300 comprises a tube 310 with a sample end 312 inserted into the fruit 10. At the sample end 312 the tube comprises an opening 322 in a side wall of the tube 310 such that the sample end 312 constitutes a cap 320 with an opening 322. The probe 300 further comprises a capillary tube 350 arranged inside the tube 310, and slidingly sealing against an inner surface of the tube 310 such that it may function as a plunger in the tube 310. An optical fiber 331 is arrange inside and along the capillary tube 350 such that the fiber end 332 is exposed at an end of the capillary tube 350. Upon inserting the tube 310 into the fruit 10, the capillary tube 350 with the optical fiber 331 is arranged in the tube 310 such that the capillary tube 350 covers the opening 322, as illustrated in FIG. 4C.

Once the sample end 312 of the tube 310 is in place inside the fruit 10, the capillary tube 350 may be retracted out from the tube 310, as illustrated in FIG. 4D. The capillary tube 350 may function as a plunger drawing juice from the fruit 10 through the opening 322 and into the tube 310. The juice entering the tube 310 may come into contact with the fiber end 332 such that the fiber end 332 may collect measurement information for analysis of the liquid.

FIG. 5 schematically illustrates a probe 400 for transmission spectrum measurements through a liquid. The probe 400 share many features with the probes 100, 200, 300, that have been described in relation to the previous figured, the details of which will not be repeated here.

The probe 400 comprises an optical measurement head 430 arranged inside a tube 410. The optical measurement head 430 comprises an optical fiber 431 configured to guide light through the optical fiber 431 to a fiber end 432. The light may come from a light source (not illustrated here) and comprise light of a specific wavelength or a range of wavelengths.

A cap 420 may be arranged at a sample end 412 of the tube 410, and when the sample end 412 is inserted into a mixture, liquid is allowed passage through openings 422, whereas solid substance is prevented from passing through the openings 422.

The light cone emitted from the optical fiber 431 may propagate through the liquid inside the inner volume 426 of the cap 420, and may eventually impinge onto a mirror 460. The mirror 460 is configured to reflect incident light from the optical fiber 431.

Inside the tube 410, alongside the optical fiber 431, one or more optical collection fibers 436 may be arranged, each of which comprises a collection fiber end 437. The optical collection fibers 436 may be arranged such that at least part of the light reflected by the mirror 460 may be coupled into the respective collection fiber ends 437.

As the emitted light propagates from the fiber end 432, through the liquid inside the inner volume 426 of the cap 420 towards the mirror 460 where the light is reflected towards the collection fiber ends 437, part of the light may be absorbed by the liquid. The light collected by the collection fiber ends 437 represents an absorption spectrum, or rather the remaining spectrum of the transmitted light.

The absorption of light may be dependent on the content of the liquid. The absorption of light may further be dependent on the pathlength of the light propagates through the liquid. Thus, if the length of the propagation path through the liquid is known, the transmission spectrum may be used to calculate the concentration of solutes in the liquid. By measuring the transmission spectrum along with the temperature of the liquid, the concentration of the solutes in the liquid may be determined provided that a calibration has been made for at least one temperature for the liquid in question.

By separating the liquid from the solid substance by means of the cap 420, a more accurate measurement may be made by the optical measurement head 430, as interference by light reflected by solid substance may be reduced or eliminated.

Although not illustrated in FIG. 5, it is conceivable that an exhaust hole such as a slot is cut out to allow air to escape while juice fills the end cap, similarly to what was described for the probe 100 in FIG. 3B.

FIG. 6 schematically illustrates a probe 500 for analysis of gastric fluid comprising a liquid and solid substance. The probe 500 may be any of the probes 100, 200, 300, 400 previously described. Thus, it should be understood that the probes 100, 200, 300, 400, 500 are not limited to being used for measurements in fruits and vegetables. By way of example, the probe 500 may be used for measurement of solutes in gastric fluid. The probe 500 may be a probe configured for measuring the index of refraction of the gastric fluid, or it may be configured for measuring a transmission spectrum, both of which are useful quantities to measure in biomedical applications. By eliminating the adverse effects of solid substances that would otherwise interfere with the measurement, the probe 500 may be used for measurements in vivo.

By way of further example, the probe 500 may be used for analysis of water quality in ground water (not illustrated here). Sand and other undissolved particles would be separated from the water and measurements are then only sensitive to the water.

FIG. 7A schematically illustrates a system 1000 for analysis of a liquid in a mixture of the liquid and solid substance. The system 1000 is based on an optical measurement technique. The system 1000 comprises a light source 1700 configured to emit light. The light source in the present embodiment is a laser, however it should be understood that the light source may alternatively be another type of light source, such as a light emitting diode, LED. The output 1702 of the light source 1700 is connected to a first optical fiber 1711. The light emitted from the light source 1700 is guided by the first optical fiber 1711 to an optical circulator 1800.

The optical circulator 1800 comprises a first port 1801 configured to receive the light from the first optical fiber 1711. The optical circulator 1800 is configured to guide the light from the first port 1801 to a second port 1802 of the optical circulator 1800. The second port 1802 is configured to emit the light to a second optical fiber 1712.

The system 1000 further comprises a probe 1100. It should be understood that the probe 1100 could be any of the probes described herein configured for collecting an optical signal. The second optical fiber 1712 guides the light to the probe 1100 such that the probe 1100 may emit the light into a liquid being analyzed. As previously described, due to differences in index of refraction, some of the light may be reflected at the interface between the fiber end of the probe 1100 and the liquid. The reflected light is guided back through the second optical fiber 1712 to the second port 1802 of the optical circulator 1800.

The optical circulator 1800 is thus configured to receive the reflected light at the second port 1802, and to guide the reflected light from the second port 1802 to a third port 1803 of the optical circulator 1803. The third port 1803 is configured to emit the reflected light into a third optical fiber 1713.

The system 1000 further comprises a detector 1900 comprising a light sensitive element. The third optical fiber 1713 is configured to guide the reflected light to the detector 1900 such that the reflected light is incident onto the light sensitive element. The light sensitive element of the detector 1900 is configured to generate an electric signal dependent on an intensity of light incident onto the light sensitive element. By the present arrangement, the amount of reflected light may be measured, and thus the index of refraction of the liquid may be calculated according to the description made in relation to FIG. 2.

FIG. 7B schematically illustrates a system 2000 for in vivo analysis of a liquid inside a plant. The system 2000 may comprise a plurality of probes 2100. The probes 2100 may be placed at various locations on the plant, as for example inside a fruit or inside a stem of the plant. Further, the probes 2100 may be connected to a common processing unit 2170, configured to perform analysis on the data collected by the plurality of probes 2100 at the various locations on the plant. By way of example, monitoring of liquid refractive index in growing plants could be used to monitor and optimize the effects of interventions, such as watering, nutrient feed, lighting etc. By placing the probes 2100 at various locations on the plant, an indication of how sugars are generated and transported into fruits may be provided.

FIG. 8 illustrates a schematic block diagram shortly summarizing the method for performing analysis of a liquid in a mixture of the liquid and solid substance. It should be understood that the steps of the method, although listed in a specific order herein, may be performed in any order suitable.

The method may comprise inserting S602 a sample end of a tube into the mixture.

The method may comprise causing S604 a cap to come into contact with the mixture at the sample end.

The method may comprise allowing S606 the liquid to pass through one or more openings of the cap.

The method may comprise preventing S608 passage of the solid substance through the one or more openings of the cap.

The method may comprise causing S610 an optical measurement head, arranged in the tube, to come into contact with the liquid having passed the one or more openings.

The method may comprise collecting S612, by the optical measurement head, measurement information for analysis of the liquid.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A probe for analysis of a liquid in a mixture of the liquid and solid substance, the probe comprising:
   a tube comprising a sample end configured to be inserted into the mixture;
   a cap configured to come into contact with the mixture at the sample end, the cap comprising one or more openings configured for allowing passage of the liquid therethrough, and for preventing passage of the solid substance therethrough; and
   an optical measurement head arranged in the tube and configured to come into contact with the liquid having passed the one or more openings, wherein the optical measurement head is configured to collect measurement information for analysis of the liquid.

2. The probe according to claim 1, wherein the optical measurement head comprises an optical fiber comprising a fiber end, the fiber end being arranged to come into contact with the liquid having passed the one or more openings.

3. The probe according to claim 2, wherein the optical fiber is further configured to guide light through the fiber to the fiber end, to emit the light through the fiber end into the liquid, and to guide reflected light through the fiber away from the fiber end, wherein the reflected light is light reflected at the interface between the fiber end and the liquid.

4. The probe according to claim 3, wherein an inner portion of the cap has a shape for preventing light emitted through the fiber end from being reflected back from the inner portion of the cap towards the fiber end.

5. The probe according to claim 3, wherein an inner portion of the cap comprises a coating of a light absorbing material, for preventing light emitted through the fiber end from being reflected back from the inner portion of the cap towards the fiber end.

6. The probe according to claim 3, wherein the optical fiber is arranged in the tube with respect to the cap such that the light emitted through the fiber end does not impinge on the one or more openings of the cap.

7. The probe according to claim 6, wherein the cap further comprises:
   a first portion arranged proximal to the fiber end, the first portion comprising all the one or more openings; and
   a second portion arranged distal to the fiber end, wherein the fiber end is further configured to emit the light as a light cone, such that the full light cone impinges on inner walls of the second portion.

8. The probe according to claim 1, further comprising an exhaust hole configured to allow air from inside the cap to pass therethrough, as the air is pushed out of the cap by the liquid passing through the one or more openings into the cap.

9. The probe according to claim 2, wherein the probe is configured for determining an index of refraction of the liquid.

10. The probe according to claim 1, wherein the tube has an outer diameter of 1.2 mm or less.

11. The probe according to claim 1, wherein each opening of the one or more openings has a diameter in the interval 0.45 µm to 1 mm, such as in the interval 10 µm to 1 mm.

12. The probe according to claim 1, wherein the probe is configured for determining a sugar content in the liquid.

13. The probe according to claim 1, wherein the cap has a pointed shape, thereby facilitating penetrating the solid substance.

14. A system for analysis of a liquid in a mixture of the liquid and solid substance, the system comprising:
   a probe according to claim 1;
   a light source configured to emit light; and
   a detector comprising a light sensitive element configured to generate an electric signal dependent on an intensity of light incident onto the light sensitive element.

15. A method of performing analysis of a liquid in a mixture of the liquid and solid substance, the method comprising:
   inserting a sample end of a tube into the mixture;
   causing a cap to come into contact with the mixture at the sample end;
   allowing the liquid to pass through one or more openings of the cap,
   preventing passage of the solid substance through the one or more openings of the cap;
   causing an optical measurement head, arranged in the tube, to come into contact with the liquid having passed the one or more openings; and
   collecting, by the optical measurement head, measurement information for analysis of the liquid.

* * * * *